Aug. 23, 1960  W. S. HAYES  2,950,364
WARNING DEVICE
Filed Oct. 4, 1956  2 Sheets-Sheet 2

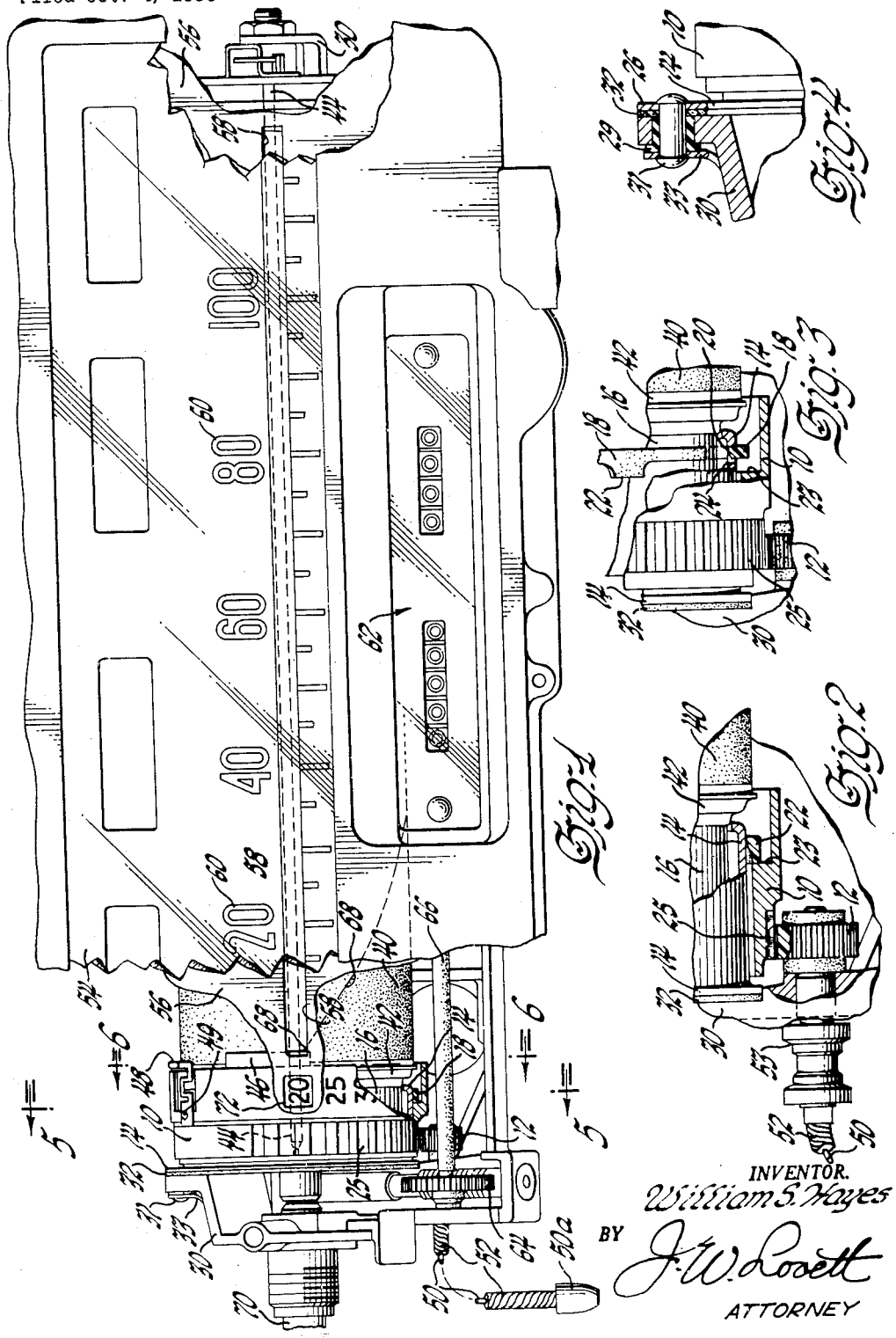

INVENTOR.
William S. Hayes
BY
J. W. Lovett
ATTORNEY

United States Patent Office

2,950,364
Patented Aug. 23, 1960

2,950,364

WARNING DEVICE

William S. Hayes, Flint, Mich., assignor to General Motors Corporation, Detroit, Mich., a corporation of Delaware Filed Oct. 4, 1956, Ser. No. 613,893

2 Claims. (Cl. 200—56)

This invention relates to warning devices and more particularly to devices capable of effecting a warning by means of a signal when a predetermined measurement such as a given speed or speed range has been reached.

In the present disclosure the warning is given by closure of an electric circuit as associated with a speedometer to operate a signal when a predetermined vehicle speed is reached by increasing or decreasing the vehicle speed. Obviously, the speed may be expressed in terms of miles per hour or in revolutions per minute and may be disassociated with vehicles without departing from the spirit of the invention as will be apparent as the description proceeds.

An operator of a vehicle is often desirous of not exceeding or proceeding below a given speed limit which limit changes depending upon the locality of operation or traffic conditions. Whatever the desired speed limit or speed range that is critical, it is advantageous to have a device which will warn the operator that such limit or range has been reached and the warning should be such as to eliminate the necessity of direct visual or close inspection to determine its existence. Electrical devices and circuits have been employed heretofore in connection with speedometers for the purpose of giving forth visual or sound effects as a warning that a given predetermined measurement of speed has been reached. These circuits have been used with dial type speedometers, but they have not been heretofore successfully employed with the elongated drum type of speedometers. Such speedometers are now popular in modern cars because of the low cowl lines in the latter which discourage the use of long pointer instruments.

An object of the present invention is to provide an improved warning device in combination with an instrument for indicating a measurement such as a speedometer of the drum type for indicating vehicle speed. Another object is to provide a warning device suitable for use with a drum type indicating instrument and which is adjustable insofar as the indication is concerned at which warning is effected.

A feature of the invention is a device employing a coaxially and rotatably mounted drum and ring arrangement with means for rotating the ring relative to the drum. Another feature is a speed warning device utilizing a ring which is manually rotatable and associated with a drum conveying an indication of data pertaining to measurements such as speed or revolutions per minute, the relative rotative positioning of the ring and drum being effective to establish a signal by means of an electrical circuit when an indication of a predetermined measurement is given by the drum.

These and other important features of the invention will now be described in detail in the specification and then pointed out more particularly in the appended claims.

In the drawings:

Fig. 1 is a front elevation of a speedometer assembly with portions broken away better to illustrate details of construction embodying features of the invention;

Fig. 2 is an enlarged and partially sectional view of drive details shown in Fig. 1;

Fig. 3 is an enlarged and partially sectional view showing ring gear retaining means and looking in the direction of arrows 3—3 in Fig. 5;

Fig. 4 is a sectional view of an electrical connection;

The present invention is disclosed as applied to a speedometer instrument utilizing an olengated, thin walled indicator drum with a helix speed indicator marking as disclosed in the United States application Serial No. 455,906 filed September 14, 1954, now Patent No. 2,909,365 in the name of Ralph O. Helgeby and entitled "Speedometer Apparatus." Details regarding the magnetic drive of the instrument, the frame as well as the specific mounting of the indicator drum are not herein specifically described as they are subject to obvious modification; equivalent constructions are described in the patent application above referred to; and extraneous features need not be employed in carrying out the present invention.

Figure 5:
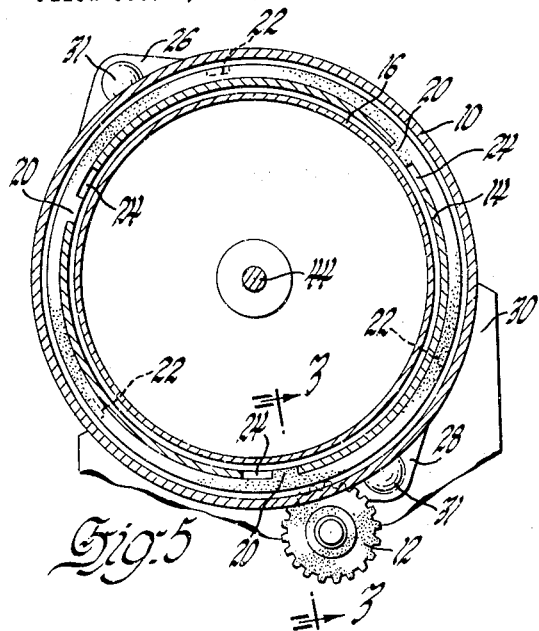
Fig. 5 is an enlarged view taken in section and looking in the direction of the arrows 5—5 in Fig. 1.
Figure 7:
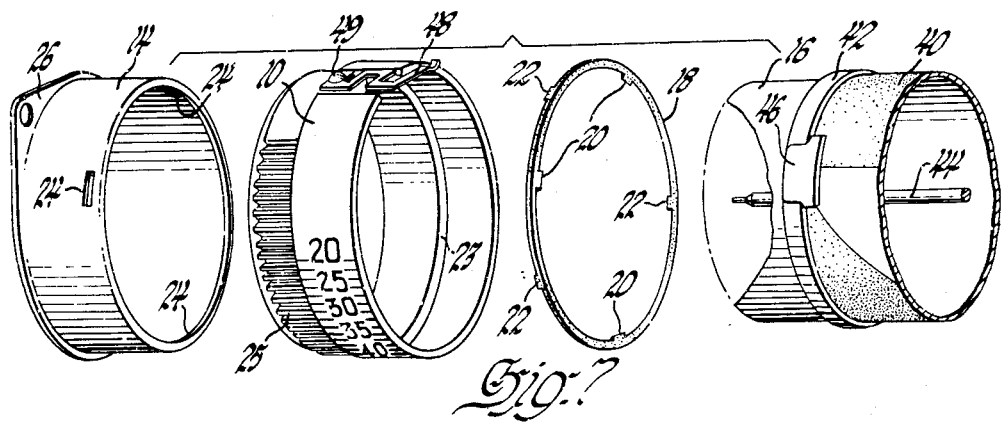
Fig. 7 is an exploded view of the ring gear and associated parts.

The speedometer or instrument disclosed in the present drawings includes as the main operative parts a ring gear or ring member 10, a pinion gear 12, a stationary field plate 14 and a speed cup 16. The ring member, field plate and speed cup are coaxially arranged; and the ring member is held in position on the field plate by means of a plastic and distortionable retainer ring 18 which permits relative rotation of the ring gear 10 on the field plate. The retainer ring 18 is made of plastic to permit assembly of the parts and it includes three radial prongs 20 (Figs. 5 and 7) as well as three parallel prongs 22. The stationary field plate 14 bears three arcuate holes 24 into which the radial prongs 20 are caused to enter. The parallel prongs 22 abut a shoulder 23 formed inside the ring member. One half of the ring member or gear 10 is in the form of a gear, the teeth 25 of which serve in rotating the ring gear with relation to an indicating drum hereinafter to be described.

The field plate 14 bears two radial and opposed flanges or ears 26 and 28 which are fixed to the instrument frame 30 by means of rivets 31.

A dielectric or insulating sheet 32 is interposed between the field plate 14 and the frame 30 and both the rivets 31 also are insulated from the frame by means of plastic grommets such as the grommet 29, shown in Fig. 4. One of the rivets 31 serves as a means of electrical connection between the field plate 14 and a line 33 which leads to a buzzer or other signal device 34 (Fig. 8) which in turn is connected to ground 36 by way of a line 37 and a battery 38.

Figure 6:
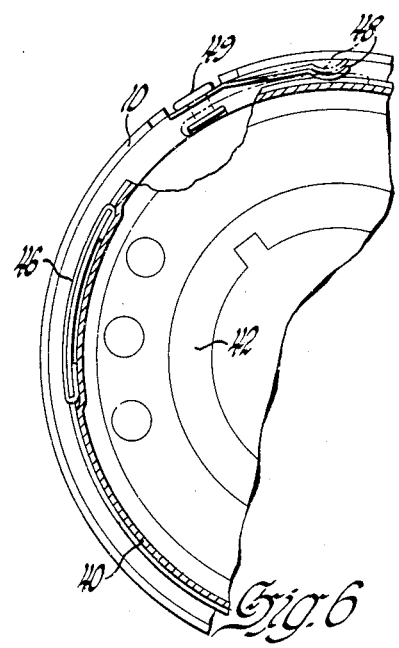
Fig. 6 is a sectional view taken along the line 6—6 in Fig. 1 and drawn to a greater scale to illustrate electrical contacts utilized in the structure of Fig. 1.

An elongated, thin walled speed indicator drum 40 is mounted on the frame 30 in a manner as disclosed in the patent application referred to, and it is provided with a metal drum cup 42 at one end as well as a central shaft 44. The speed cup 16 is fixed to the cup 42 and is adapted to rotate within the field plate 14. A contact plate 46 is fixed to one side of the drum cup 42. It is attached to the drum by crimping around portions of the latter, as shown in Fig. 6.

Figure 8:
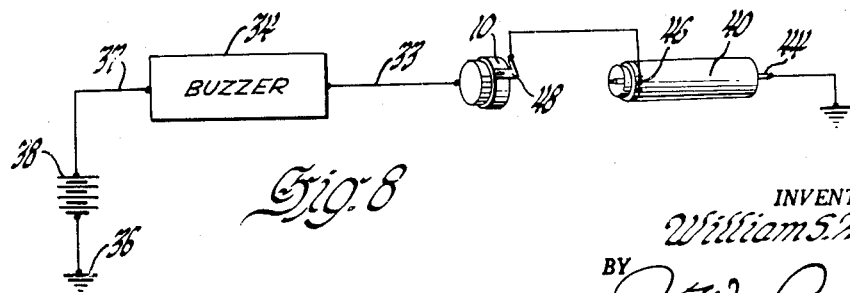
Fig. 8 is a diagrammatic representation of a wiring diagram.

A spring contact 48 is fixed to the ring gear 10 by means of a rivet 49 and the arrangement is such that a free end of the contact resiliently bears against a nonconductive or paint part of the drum and, being in the same plane as the contact plate 46, rotation of one contact with relation to the other will cause their engagement to complete a circuit as illustrated in Fig. 8.

A Bowden wire 50 is operatively connected to the pinion gear 12 and is protected by a suitable conduit 52. The wire is connected to the gear by a coupling 53 supported on the frame 30, and this wire extends to a zone wherein it may be manually and conveniently rotated by an operator through use of a knob 50a fixed to the wire.

A transparent plastic plate 54 is arranged along the front of the instrument and is backed up by an opaque plate 56 having an elongated slot 58 arranged parallel to the shaft 44. A scale giving figures 60 expressed in miles per hour is painted on the transparent plate 54 along the slot 58.

An odometer is generally indicated at 62 and this is provided with a conventional odometer drive gear 64 and drive shaft 66 supported on the frame 30.

As disclosed in the patent application referred to, the drum 40 is provided with a helical marking 68 and is adapted to be driven from a drive shaft 70 through a permanent magnet mounted on the drive shaft within the stationary field plate 14 and cup 16. A magnetic plate member (not shown) is secured to the indicator drum shaft 44 to form a magnetic circuit with the magnet, these members being disposed in the open end or speed cup 16; but these elements are not novel portions of the present invention and, therefore, are not specifically described herein. The field plate 14 is similar to the field plate disclosed in the patent application except for the provision of the three arcuate holes 24 and, with the ring gear 10 assembled on the field plate 14 as described, it will be seen that the ring gear may be manually rotated by means of the Bowden wire 50 to locate a portion of the ring gear insignia so that it may be seen through a window 72 formed in the opaque plate 56. The contacts 46 and 48 are relatively so placed that when a speed of 20 miles per hour is indicated through the slot 58 by the marking 68 on the drum 40, an electrical circuit will be established providing the figure 20 is placed in view through the window 72. Accordingly, if the ring gear 10 is set to show 20 through the window, the signal or buzzer 34 will give a warning when the vehicle reaches a 20 mile per hour speed. In the event that a warning is desired at 60 miles per hour, then the ring gear 10 is rotated by means of the Bowden wire 50 until the figure 60 appears in the window 72. This will cause the contact 48 to be pre-set or suitably spaced from the contact 46 so that the electrical warning circuit will be effective only while the vehicle speed is in the neighborhood of 60 miles per hour. The arcuate length of the contact 46 as shown extends to 15 miles per hour beyond the preset speed and may, of course, be increased or reduced to secure a desired range of speed over which the warning will be effective.

It will be appreciated that the electrical circuit may not only operate a signal to give a warning but may be employed to effect a control of a device such as a vehicle brake, a speed governor mechanism or a carburetor at the pre-set speed and that the present invention includes such a concept. It should also be realized that the window 72 could be located in the opaque frame of the instrument or speedometer instead of in the plate 56 and that the ring gear 10 need not be coaxial with the drum 40 although such arrangement is preferable.

I claim:

1. A magnetically driven speed warning device of the type using a stationary field plate, a speed cup and a permanent magnet on a drive shaft, said device comprising an elongated drum with a marking on its surface, a first contact fixed to said drum at a distance from the axis of the latter, a frame rotatably supporting said drum, an annular field plate fixed to and insulated from said frame, a ring member bearing speed insignia along its periphery and journaled for rotation about said fixed field frame on the axis of said drum, fixed opaque means partially concealing said drum and ring member, a window in said opaque means disclosing a portion of said insignia as a setting at which said warning device may be effective, a second contact on said ring member in the path of said first contact, means connected to said ring member and independent of the said drum for manually rotating said ring member and registering a selected portion of said insignia with said window, and one of said contacts being relatively slidable and yieldable with respect to the other in a radial direction with respect to said ring member.

2. A speed warning device as set forth in claim 1 in which the said opaque means bears an elongated slot, said marking being viewable through said slot, gear means engaging said ring member for manual rotation of the latter to acquire said setting, and one of said contacts being radially yieldable with respect to the axis of said drum to pass the other upon rotation of said drum beyond a given setting as determined by said registering and selected portion of said insignia.

References Cited in the file of this patent

UNITED STATES PATENTS

| | | |
|---|---|---|
| 1,538,009 | Slaight | May 19, 1925 |
| 2,231,111 | Caldwell | Feb. 11, 1941 |
| 2,249,389 | Knob | July 15, 1941 |